(12) United States Patent
Hirota

(10) Patent No.: US 8,917,957 B2
(45) Date of Patent: Dec. 23, 2014

(54) APPARATUS FOR ADDING DATA TO EDITING TARGET DATA AND DISPLAYING DATA

(75) Inventor: Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 12/631,405

(22) Filed: Dec. 4, 2009

(65) Prior Publication Data

US 2010/0142769 A1  Jun. 10, 2010

(30) Foreign Application Priority Data

Dec. 8, 2008  (JP) ................. 2008-312627

(51) Int. Cl.
*G06K 9/54*  (2006.01)
*G06F 17/30*  (2006.01)
*G06K 9/00*  (2006.01)

(52) U.S. Cl.
CPC ...... *G06F 17/30271* (2013.01); *G06K 2209/27* (2013.01); *G06K 9/00422* (2013.01)
USPC ....................................................... 382/305

(58) Field of Classification Search
CPC ................................................ G06K 9/00684
See application file for complete search history.

(56) References Cited

U.S. PATENT DOCUMENTS

| | | | |
|---|---|---|---|
| 5,680,480 A * | 10/1997 | Beernink et al. ............. | 382/187 |
| 5,706,457 A * | 1/1998 | Dwyer et al. ................. | 715/835 |
| 6,226,636 B1 * | 5/2001 | Abdel-Mottaleb et al. .......... | 1/1 |
| 6,629,104 B1 * | 9/2003 | Parulski et al. ............... | 382/307 |
| 7,359,954 B2 * | 4/2008 | Friedman et al. ............. | 709/217 |
| 8,108,408 B2 * | 1/2012 | Kondo et al. ................. | 707/749 |
| 8,270,764 B1 * | 9/2012 | Agarwala et al. ............. | 382/284 |
| 8,503,735 B2 * | 8/2013 | Morita ......................... | 382/115 |
| 2002/0141643 A1 * | 10/2002 | Jaeger .......................... | 382/181 |
| 2005/0024341 A1 * | 2/2005 | Gillespie et al. .............. | 345/173 |
| 2005/0162523 A1 * | 7/2005 | Darrell et al. ............... | 348/211.2 |
| 2005/0278379 A1 * | 12/2005 | Nakazawa ................. | 707/104.1 |
| 2005/0281467 A1 * | 12/2005 | Stahovich ..................... | 382/202 |
| 2006/0170669 A1 * | 8/2006 | Walker et al. ................. | 345/418 |
| 2007/0180400 A1 * | 8/2007 | Zotov et al. ................... | 715/788 |
| 2007/0237421 A1 * | 10/2007 | Luo et al. ...................... | 382/284 |

(Continued)

FOREIGN PATENT DOCUMENTS

| | | | | |
|---|---|---|---|---|
| JP | 08-077295 A | 3/1996 | | |
| WO | WO2009147840 A1 * | 10/2009 | ............. | G06F 17/30 |
| WO | WO 2009147840 A1 * | 12/2009 | ............. | G06F 17/30 |

OTHER PUBLICATIONS

Retrieval of sketches—strokes., Leung et al., IEEE, 0/7803-7622-6, 2002, pp. 908-911.*

A perceptually—supported sketch editor., Saund et al. ACM 0-89791-657-3, 1994, pp. 175-184.*

(Continued)

*Primary Examiner* — Jayesh A Patel
(74) *Attorney, Agent, or Firm* — Canon USA Inc IP Division

(57) ABSTRACT

An object of the present invention is to enhance search accuracy when additional data to be added to editing target data is searched using handwriting input. An information processing method performed by an information processing apparatus includes inputting a pattern to editing target data, acquiring attribute information of the editing target data, searching additional data to be added to the editing target data by using the pattern and the attribute information, and displaying the additional data, which is searched by the search unit and added to the editing target data.

13 Claims, 19 Drawing Sheets

(56) References Cited

U.S. PATENT DOCUMENTS

| | | | |
|---|---|---|---|
| 2008/0002886 A1* | 1/2008 | Revow et al. | 382/187 |
| 2008/0048979 A1* | 2/2008 | Ruttenberg | 345/158 |
| 2008/0292181 A1* | 11/2008 | Kasai et al. | 382/159 |
| 2012/0051644 A1* | 3/2012 | Das et al. | 382/190 |
| 2013/0058583 A1* | 3/2013 | Gallagher et al. | 382/224 |

OTHER PUBLICATIONS

Hierarchial matching—sketches, Leung et al., IEEE, 0/7803-7965-9, 2003, pp. 29-32.*

Retrieval of sketches—strokes., Leung et al., IEEE, 0/7803-7622-6, 2002, pp. 908-911.*

* cited by examiner

FIG. 6

ICON DATABASE

| ID | 1 | 2 | 3 | 4 |
|---|---|---|---|---|
| ICON | | | | |
| HAND-WRITING STROKE | | | | |
| ADEQUATE PERIOD FOR USE | | SUMMER | CHRISTMAS | |
| CONTENTS | FLOWER PETALS | STRAW HAT | SANTA CLAUSE'S CAP | HEART |

601 — HAND-WRITING STROKE
602 — ADEQUATE PERIOD FOR USE

FIG. 7

| | MATCHING LEVEL (A) OF HAND-WRITING STROKE | CLOSENESS (B) OF PERIOD | TOTAL MATCHING LEVELS (A+B) |
|---|---|---|---|
| ICON 1 | 0.1 | 0.0 | 0.1 |
| ICON 2 | 0.9 | 0.0 | 0.9 |
| ICON 3 | 0.8 | 1.0 | 1.8 |
| ICON 4 | 0.1 | 0.0 | 0.1 |

FIG. 8
ICON DATABASE
| ID | 1 | 2 | 3 | 4 |
|---|---|---|---|---|
| ICON | 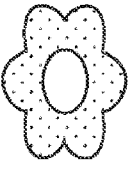 | 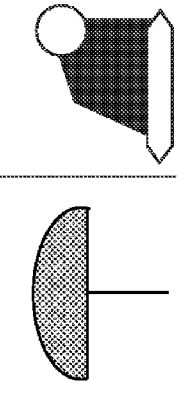 |  | 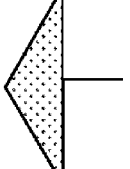 |
| HAND-WRITING STROKE |  |  | 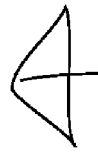 | |
| ADEQUATE PERIOD FOR USE | | BEACH | | |
| CONTENTS | FLOWER PETALS | BEACH PARASOL | SANTA CLAUSE'S CAP | UMBRELLA FOR COUPLE |
801
802

FIG. 10

| ID | LATITUDE | LONGITUDE | LOCATION TYPE |
|---|---|---|---|
| 1 | 35.4 | 140.5 | BEACH |
| 2 | 35.1 | 137.8 | MOUNTAIN |
| 3 | 34.2 | 135.3 | TOWN |
| 4 | 35.5 | 139.4 | BEACH |
| 5 | 34.6 | 141.7 | SEA |
| 6 | 32.1 | 131.4 | MOUNTAIN |
| 7 | 43.3 | 141.4 | TOWN |

FIG. 11

| | MATCHING LEVEL (A) OF HAND-WRITING STROKE | SIMILARITY OF LOCATION TYPE (B) | TOTAL MATCHING LEVELS (A+B) |
|---|---|---|---|
| ICON 1 | 0.1 | 0.0 | 0.1 |
| ICON 2 | 0.8 | 1.0 | 1.8 |
| ICON 3 | 0.2 | 0.0 | 0.2 |
| ICON 4 | 0.9 | 0.0 | 0.9 |

FIG. 14
ICON DATABASE
| ID | 1 | 2 | 3 | 4 |
|---|---|---|---|---|
| ICON | 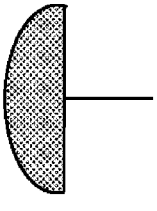 | 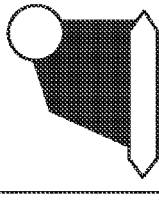 | 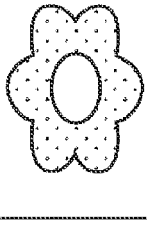 | 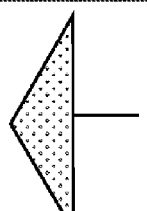 |
| HAND-WRITING STROKE |  |  | | |
| NUMBER OF FACES | | ARBITRARY | 1 | 2 |
| POSITION OF FACE | | DOWN | DOWN | DOWN |
| CONTENTS | FLOWER PETALS | BEACH PARASOL | SANTA CLAUSE'S CAP | UMBRELLA FOR COUPLE |
1401 — HAND-WRITING STROKE
1402 — NUMBER OF FACES
1403 — POSITION OF FACE

FIG. 17

|  | MATCHING LEVEL (A) OF HAND-WRITING STROKE | MATCHING LEVEL OF NUMBER OF FACES (B) | MATCHING LEVEL OF FACE POSITION (C) | TOTAL MATCHING LEVELS (A+B+C) |
|---|---|---|---|---|
| ICON 1 | 0.1 | 0.0 | 0.0 | 0.1 |
| ICON 2 | 0.9 | 0.2 | 1.0 | 2.1 |
| ICON 3 | 0.3 | 0.0 | 1.0 | 1.3 |
| ICON 4 | 0.8 | 1.0 | 1.0 | 2.8 |

FIG. 19 (PRIOR ART)

ICON DATABASE

| ID | 1 | 2 | 3 | 4 |
|---|---|---|---|---|
| ICON | (flower) | (straw hat) | (santa cap) | (heart) |
| HAND-WRITING STROKE | (flower outline) | (hat outline) | (cap outline) | (heart outline) |
| CONTENTS | FLOWER PETALS | STRAW HAT | SANTA CLAUSE'S CAP | HEART |

1601 — HAND-WRITING STROKE

APPARATUS FOR ADDING DATA TO EDITING TARGET DATA AND DISPLAYING DATA

BACKGROUND OF THE INVENTION

1. Field of the Invention

The present invention relates to an information processing apparatus and an information processing method.

2. Description of the Related Art

Digital devices mounting a touch panel have become popular in recent years. In addition to mobile phones, an increasing number of products mounting a touch panel, such as digital cameras and multifunctional printers, have been on the market. Some products enable a user to perform input by handwriting as well as by touching the touch panel with a finger or a pen.

There have been known a growing number of application models, for example, that allows users to write freehand on the panel and search by using a handwriting command or a handwriting input as a key and by combining a handwriting recognition technology.

Japanese Patent Application Laid-Open No. 08-077295 discusses a search method that enables the handwriting input as a key. In such a search using the handwriting input as the key, handwriting stroke information to be compared with the handwriting input is held at a side to be searched and compared with the input handwriting stroke to perform the search.

The search method performed by using the handwriting input as the key is advantageous in that a user can intuitively input a search key by handwriting. On the other hand, when a plurality of objects to be searched has information including similarly shaped handwriting strokes, an object different from a desired object may be obtained as a search result.

For example, an application is known for searching a shape of a desired icon by using the handwriting input to add an icon to a picture displayed on the touch panel. In this case, a prior art includes icon database as illustrated in FIG. 19, and gives to each icon information including the handwriting stroke having a similar shape thereto.

The prior art performs the search by evaluating a matching level between the input handwriting stroke and the handwriting stroke, which has been previously given to each icon. In a case illustrated in FIG. 19, since the handwriting strokes of icons 2 and 3 have similar shapes to each other, a problem may occur. For example, an icon of a "straw hat" may be searched when an icon of a "Santa Clause's hat" is desired.

SUMMARY OF THE INVENTION

The present invention is directed to an information processing apparatus with an enhanced search accuracy at a time when additional data to be given to editing target data is searched using a handwriting input.

According to an aspect of the present invention, an information processing apparatus includes an input unit configured to input a pattern to editing target data, an acquisition unit configured to acquire attribute information of the editing target data, a search unit configured to search additional data to be added to the editing target data by using the pattern and the attribute information, and a display unit configured to display the additional data which is searched by the search unit and added to the editing target data.

The present invention may further include an information processing method, a program, and a recording medium thereof.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of an icon database.

FIG. 7 illustrates an example of calculated results of matching levels.

FIG. 8 illustrates an example of an icon database.

FIG. 10 is a table illustrating latitude, longitude, and information about location types corresponding thereto.

FIG. 11 illustrates an example of the calculated results of the matching levels.

FIG. 14 illustrates an example of the icon database.

FIG. 17 illustrates an example of the calculated results of the matching levels.

FIG. 19 illustrates an example of a conventional icon database.

DESCRIPTION OF THE EMBODIMENTS

Various exemplary embodiments, features, and aspects of the invention will be described in detail below with reference to the drawings.

Figure 1:
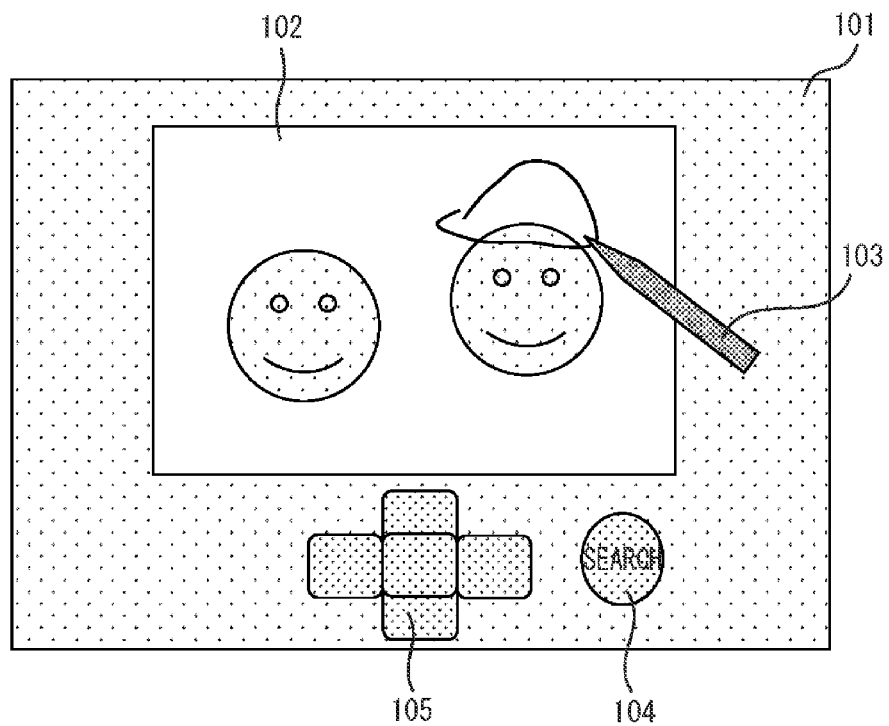
FIG. 1 is a schematic view of a photo printer.

The present exemplary embodiment will be described using a photo printer as an example of an information processing apparatuses. The photo printer displays a photo on a touch panel thereof as illustrated in FIG. 1. A user performs an editing work such as adding an icon (i.e., additional data) onto the photo.

Figure 2:
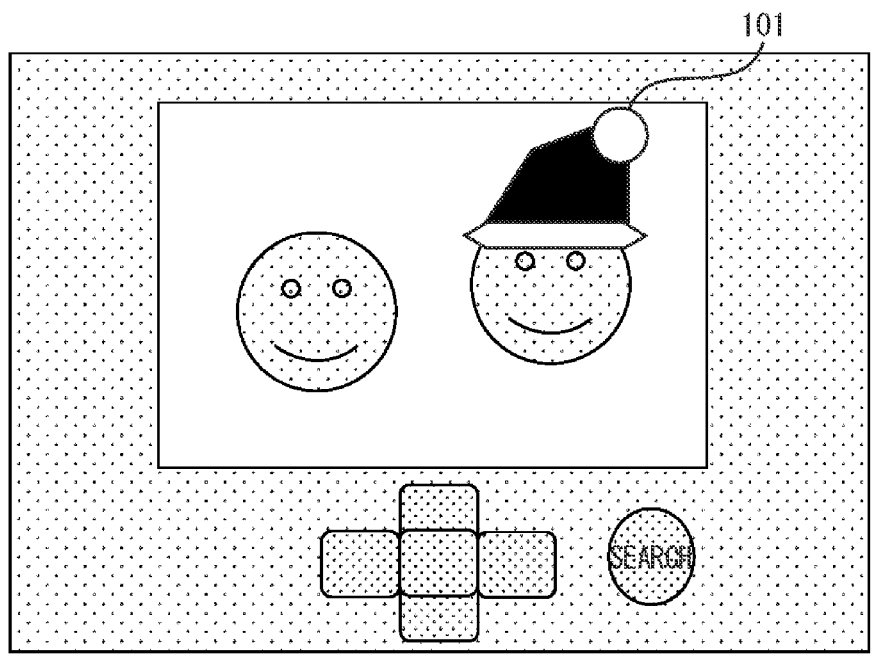
FIG. 2 illustrates an example of a touch panel of the photo printer when a searched icon is displayed thereon

The user inputs by handwriting a shape of an icon to be added. The photo printer searches an icon having a similar shape to that of the input handwriting stroke from the icon database. And then, the photo printer replaces the handwriting stroke with the searched icon and displays the icon on the touch panel as an icon 401 illustrated in FIG. 2. The icon represents image data such as a figure and a picture.

FIG. 1 is a schematic view of the photo printer. In FIG. 1, a photo printer 101 includes a touch panel 102 for displaying a photo to be printed, a search button 104, and a cross key 105. A pen 103 is used to input to the touch panel 102 by handwriting or touching. The search button 104 is used for searching an icon described below.

Figure 3:
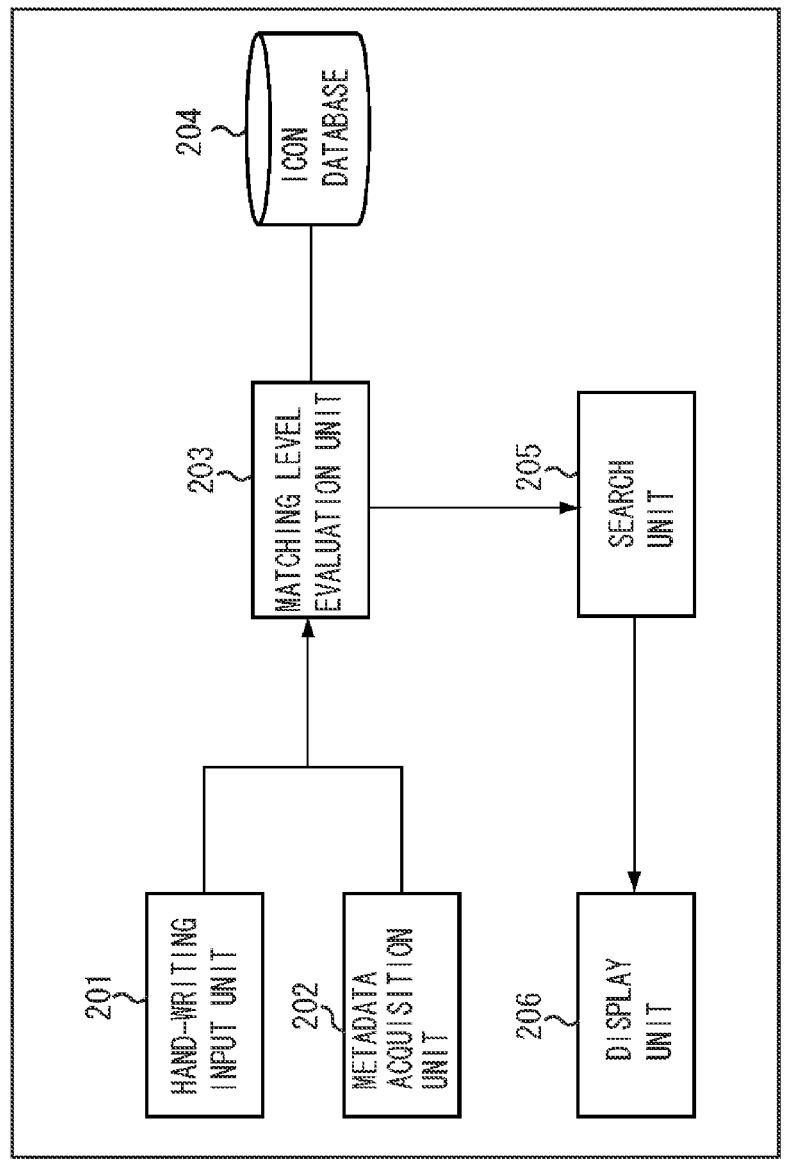
FIG. 3 is a block diagram illustrating an example of a functional configuration of the photo printer.

FIG. 3 is a block diagram illustrating an example of a functional configuration of the photo printer. In FIG. 3, a handwriting input unit 201 receives handwriting input to the touch panel 102 by the pen 103. A metadata acquisition unit 202 retrieves metadata given to the photo displayed on the touch panel 102. A matching level evaluation unit 203 evaluates a matching level. An icon database 204 holds and manages icon data, which is to be added and displayed on the photo. A search unit 205 outputs as a search result an icon whose matching level is evaluated to be highest by the matching level evaluation unit 203. A display unit 206 displays on the touch panel 102 the photo, a track of handwriting input, and an icon output by the search unit 205.

Figure 4:
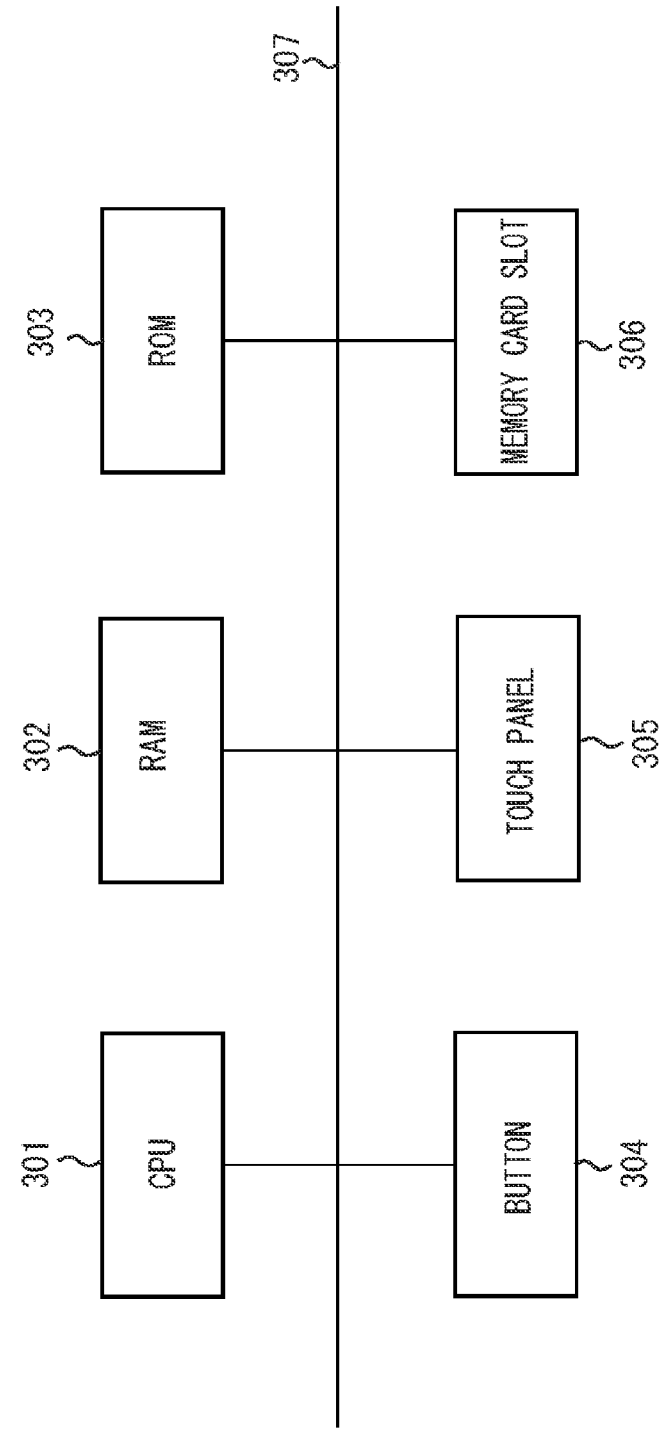
FIG. 4 is a diagram illustrating an example of a hardware configuration of the photo printer.

FIG. 4 is a diagram illustrating an example of a hardware configuration of the photo printer. In FIG. 4, a central processing unit (CPU) 301 executes processing according to a program for implementing an operational procedure by the photo printer described below. A random access memory (RAM) 302 provides a storage region necessary for operating the program. A read only memory (ROM) 303 holds a program for implementing the operational procedure of the program and icon data of the icon database 204. The ROM 303 is an example of an additional data storage device. Each of various buttons 304 and a touch panel 305 are included in the configuration. The display unit 206 displays the photo on the touch panel 305. A memory card slot 306 and a bus 307 are included in the configuration.

Figure 5:
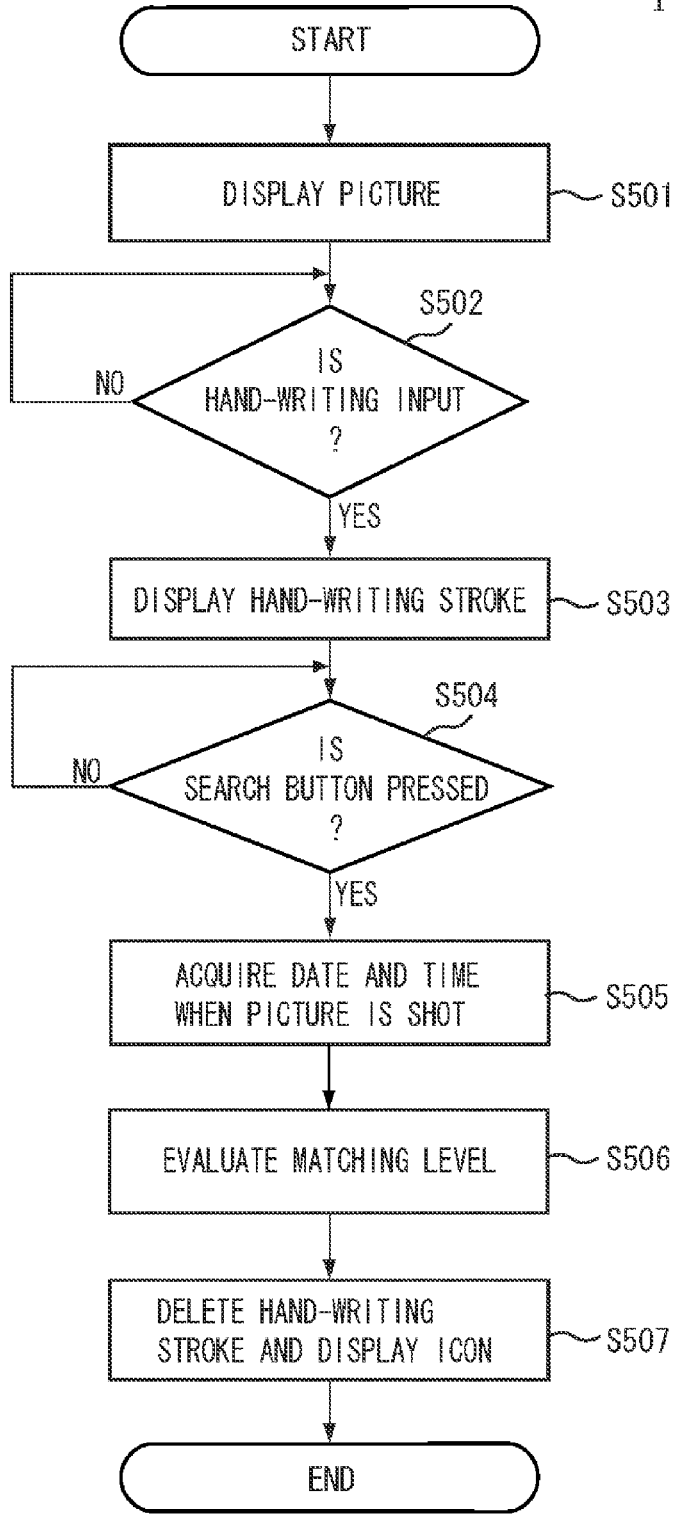
FIG. 5 is a flowchart illustrating an example of processing performed by the photo printer.

FIG. 5 is a flowchart illustrating an example of processing performed by the photo printer. In step S501, the photo printer 101 displays a photo on the touch panel 102 as illustrated in FIG. 1. The photo is stored in a memory card inserted into the memory card slot 306. Information about shooting date and time of each photo is stored as the metadata.

Further, as described above, the photo printer 101 includes the icon database 204, for example, a database illustrated in FIG. 6. More specifically, the icon database holds a plurality of icon data and each icon data includes an icon, which is an example of additional data, and handwriting stroke information 601, which is an example of second track information when the shape of the icon is handwritten.

Furthermore, each icon data includes information (period information) 602 about a period (time of season) when the icon is most likely to be used, which is an example of attribute information previously associated with the icon. For example, in a case of a "Santa Clause's cap" icon, since the icon is most likely to be used in a period of Christmas, the period information of "Christmas" is given to the icon. Similarly, the period information of "summer" is given to the icon data of a "straw hat" icon.

While the photo is being displayed, when a user performs handwriting input to the touch panel by operating a pen (by the user's operation) (YES in step S502), in step S503, the photo printer 101 displays the handwriting stroke on the touch panel.

Subsequently, when the search button 104 is pressed (YES in step S504), the handwriting input unit 201 of the photo printer 101 inputs information (track information) about the handwriting stroke (handwriting stroke information input). The photo printer 101 searches the icon based on the handwriting stroke information, which is an example of first track information.

In order to search the icon, firstly, in step S505, the metadata acquisition unit 202 of the photo printer 101 acquires the information about the shooting date and time of the displayed photo (editing target data attribute information acquisition). The matching level evaluation unit 203 of the photo printer 101 evaluates the matching level between each icon stored in the icon database and the icon corresponding to the user's intension.

In order to evaluate (calculate) the matching level, the matching level evaluation unit 203 calculates the matching level between the handwriting stroke information input by the user using the handwriting input unit 201 and handwriting stroke information 601 given to each icon. The above-described matching level between the stroke information and other stroke information can be calculated by the matching level evaluation unit 203 by using the prior art such as the above-described Japanese Patent Application Laid-Open No. 08-077295.

Additionally, the photo printer 101 calculates the matching level (closeness) between the information about the photo shooting date and time and the information 602 about the period when the icon is most likely to be used. The matching level evaluation unit 203 evaluates the final matching level (total matching level) by calculating both matching levels described above.

For example, in a case where the shooting date and time of the photo displayed on the touch panel 102 in FIG. 1 is "Dec. 24, 2007", the photo printer 101 calculates the matching levels of four icons 1, 2, 3, and 4 in FIG. 6 as illustrated in FIG. 7.

Since the icons 2 and 3 have similar shapes to those of the handwriting strokes thereof, the matching levels of the handwriting strokes of icon 2 and icon 3 with the handwriting stroke information input by the user are high. Further, since the icon 2 has the more similar shape to that of the handwriting stroke input by the user than the icon 3, the matching level of the icon 2 has the larger value than the icon 3.

On the other hand, regarding the closeness between the shooting date and time and the period when the icon is most likely to be used, the "Christmas" of the icon 3 is closest to "Dec. 24, 2007", which is the shooting date and time. Thus, the icon 3 has the largest value. Other icons have smaller values of the matching levels about the periods.

As described above, the matching level evaluation unit 203 calculates the total matching level of each icon as illustrated in FIG. 7. The search unit 205 outputs the icon having the highest total matching level (the icon 3 in the example of FIG. 7) as the search result. In step S507, the display unit 206 displays the icon 3, as icon 401 illustrated in FIG. 2, in place of the handwriting stroke input by the user on the touch panel.

The matching level evaluation unit 203 may set the "Christmas" to "December 25" and perform the calculation such that the matching level representing the closeness is decreased by a predetermined value every time mismatch between the shooting date and time and the "December 25" is increased by one day.

Further, the matching level evaluation unit 203 may set the "Christmas" to "December 25" and calculate the matching level to be "1" when the mismatch between the shooting date and time and "December 25" is within a predetermined period, and to be "0" when other cases. Furthermore, the matching level evaluation unit 203 can give the "Christmas" a range of the period, for example, between "December 18$^{th}$" and the 25$^{th}$".

The matching level evaluation unit 203 may perform the calculation such that the matching level representing the closeness is decreased by the predetermined value every time the mismatch between the shooting date and time and the "Christmas" period is increased by one day, by comparing the "Christmas" period having the range of the period with the shooting date and time. Alternatively, based on whether the shooting date and time is apart from the "Christmas" period by the predetermined period, the matching level evaluation unit 203 may calculate the matching level to be "1" when the shooting date and time is not apart from the "Christmas" period by the predetermined period, and to be "0" when it is apart by the predetermined period.

If the photo printer 101 had performed the search by using only the matching level of the handwriting stroke information, the icon 2 should have been obtained as the search result. However, the shooting date and time of the photo to which the icon is to be added and the period information given to the icon are added to evaluate the matching level so that the different search result can be obtained.

More specifically, as the search result, the photo printer 101 does not display the icon 2 of the "straw hat" but displays the "Santa Clause's cap" of the icon 3, which is more suitable for the date of "Dec. 24, 2007". As described above, the present exemplary embodiment can enhance search accuracy and enables the user to efficiently work on editing for adding the icon onto the photo.

In the first exemplary embodiment, the closeness between the photo shooting date and time and the period when the icon is most likely to be used is used for evaluating the matching level. Further, metadata of the photo other than the shooting date and time can be used.

Some mobile phones each having a digital camera or a camera in recent years mount a global positioning system (GPS) function, which can give the photo a shooting location (i.e., latitude and longitude information) as metadata. In a second exemplary embodiment, by using information about the photo shooting location, an example in which accuracy for searching the icon to be added is enhanced will be described.

FIG. 8 illustrates an example of icon database. More specifically, similar to the first exemplary embodiment, the icon data includes handwriting stroke information 801 for a case when the shape of the icon is handwritten. Further, the icon data includes information 802 about a location where the icon is likely to be used.

Figure 9:
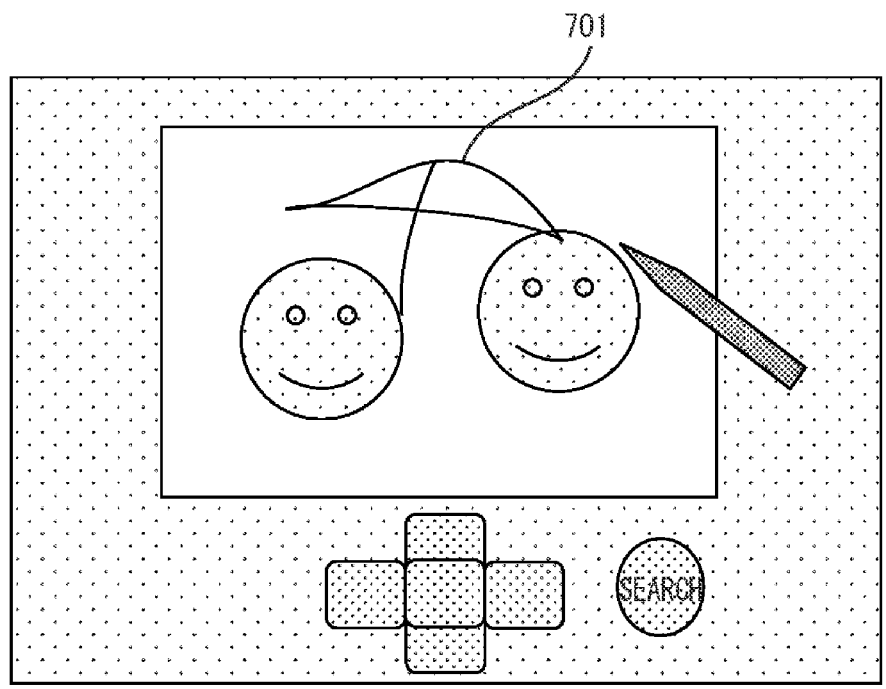
FIG. 9 illustrates an example of the touch panel of the photo printer when handwriting is input thereon.

Similar to the first exemplary embodiment, when the handwriting is input onto the photo as a handwriting stroke 701 illustrated in FIG. 9 and the search button 104 is pressed, the handwriting input unit 201 of the photo printer 101 inputs the handwriting stroke information. The photo printer 101 searches the icon based on the input handwriting stroke information.

In order to search the icon, the metadata acquisition unit 202 of the photo printer 101 acquires information about the latitude and longitude of the shooting location, which is given to the photo on which the handwriting is given. For example, the given latitude and longitude are expressed as follows.

Latitude=356

Longitude=139.2.

The photo printer 101 includes a table in which the latitude and longitude, and information about a location type corresponding thereto as illustrated in FIG. 10. The metadata acquisition unit 202 can acquire the type of the location where the photo is shot, from this table and the latitude and longitude information about the shooting location given to the photo. In the present exemplary embodiment, from the above-described latitude and longitude values, it can be known that the location type is a "beach", since a location of "ID=4" has the highest similarity to the shooting location.

Subsequently, the matching level evaluation unit 203 evaluates the matching level of each icon held in the icon database as illustrated in FIG. 8 based on the handwriting stroke information 701 and the information of the location type=the "beach". FIG. 11 illustrates an example of the evaluation of the matching levels.

Since the icons 2 and 4 have handwriting stroke shapes each similar to that of the input handwriting stroke 701, the matching levels of the icons 2 and 4 have the large values. Further, since the icon 4 has more similar shape of the handwriting stroke information to that of the input handwriting stroke 701 than the icon 2, the icon 4 has the larger value.

On the other hand, the icon 2 has the highest similarity between the shooting location and the location where the icon is likely to be used. Thus, the icon 2 has the largest value. Other icons have smaller values of the matching levels about the locations. Accordingly, the icon 2 is determined to have the highest matching level, and thus the icon 2 is the search result.

Figure 12:
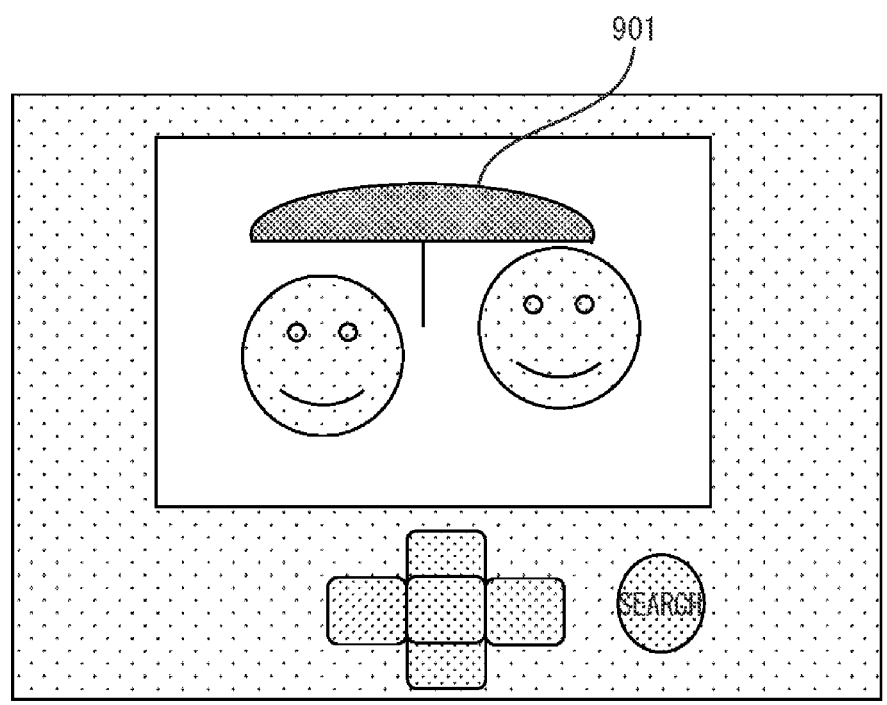
FIG. 12 illustrates an example of the touch panel of the photo printer when a searched icon is displayed thereon.

The display unit 206 displays the icon 2 as the icon 901 illustrated in FIG. 12 in place of the handwriting stroke on the touch panel.

If the photo printer 101 had performed the search by using only the matching level of the handwriting stroke information, the icon 4 should have been obtained as the search result. However, the shooting location of the photo on which the icon is to be added is given to evaluate the matching level so that a "beach parasol", which is more suitable for the "beach" rather than an "umbrella for couple", can be obtained as the search result.

As described above, the present exemplary embodiment can enhance the search accuracy and enables the user to efficiently work on editing for adding the icon on the photo.

The first and second exemplary embodiments use the metadata given to the photo to search the icon. The present exemplary embodiment will describe an example in which a face recognition technology is used to obtain information about the face in the photo is used to search the icon.

Figure 13:
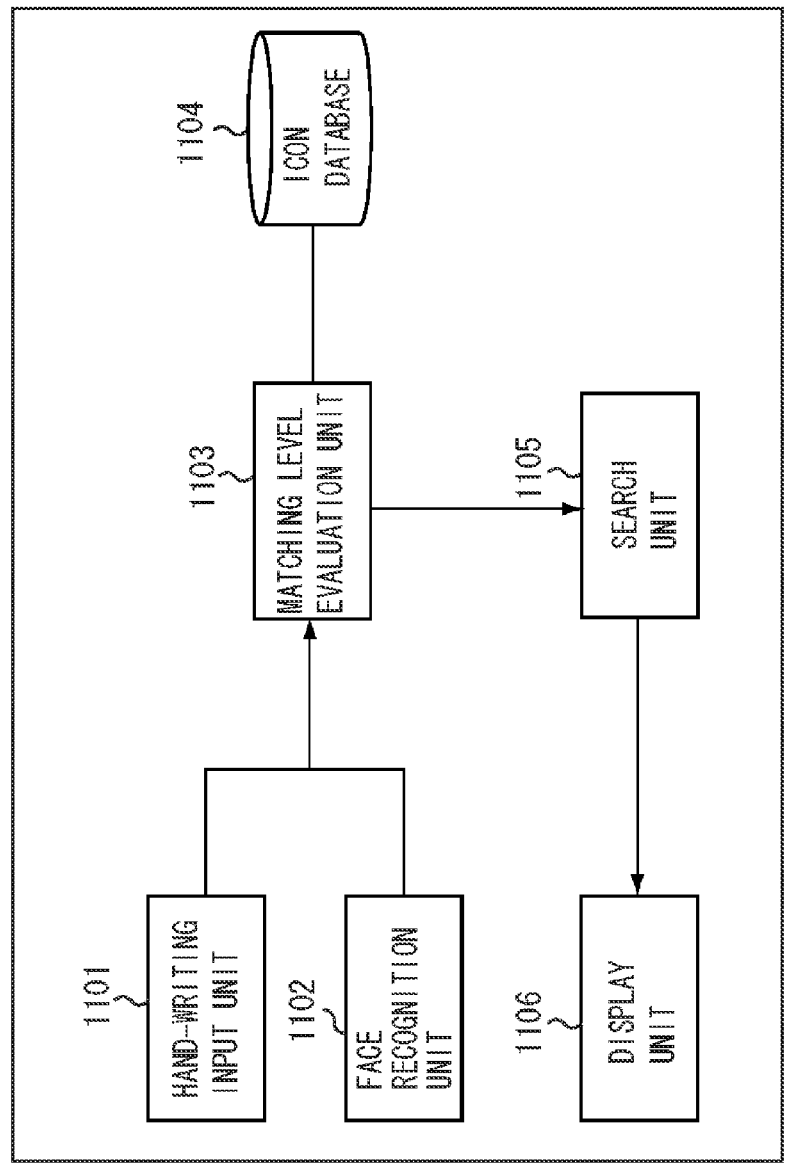
FIG. 13 is a block diagram illustrating an example of the functional configuration of the photo printer.

FIG. 13 is a block diagram illustrating an example of a functional configuration of a photo printer. The handwriting input unit 1101 receives the handwriting to be input to the touch panel 102 by the pen 103.

A face recognition unit 1102 extracts and acquires positions and the number of the faces in the photo displayed on the touch panel 102. A matching level evaluation unit 1103 evaluates the matching level. Icon database 1104 holds the icon data to be added and displayed on the photo. A search unit 1105 outputs as the search result the icon whose matching level is evaluated to be highest by the matching level evaluation unit 203. A display unit 1106 displays the photo, the track of the handwriting input, and the searched icon on the touch panel 102.

FIG. 14 illustrates an example of the icon database. More specifically, similar to the first exemplary embodiment, the icon data includes handwriting stroke information 1401 about the handwritten shape of the icon. Further, the icon data includes information 1402 about the number of the faces in the photo, which is likely to be used, and information 1403 about the position of the faces.

According to the icon database, for example, regarding the icon 2 of the "beach parasol", many cases have "uncertain" number of faces "under" the "beach parasol". Further, regarding the icon 4 of the "umbrella for couple", many cases have "two" faces "under" the "umbrella for couple".

Figure 15:
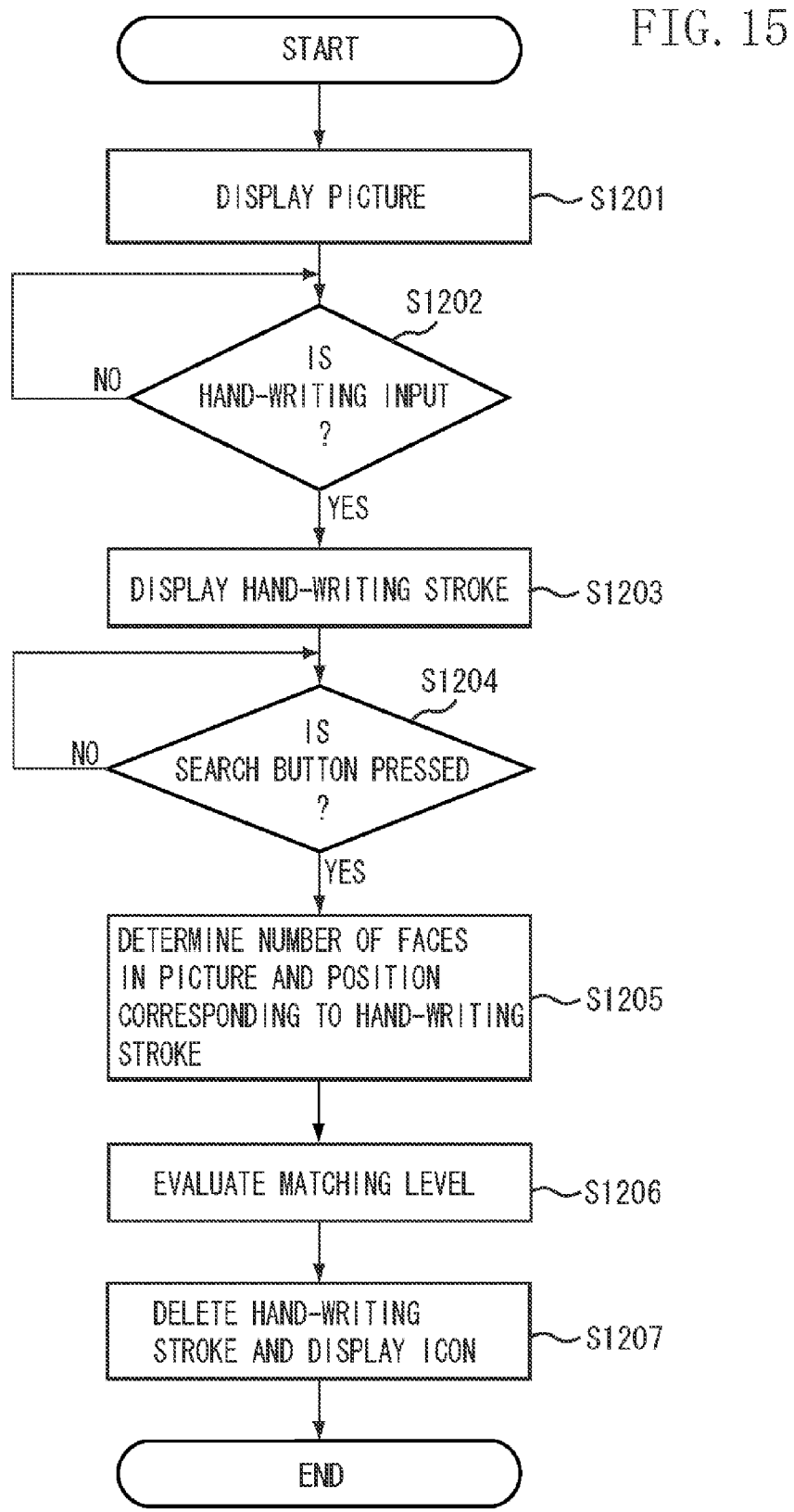
FIG. 15 is a flowchart illustrating an example of the processing performed by the photo printer.
Figure 16:
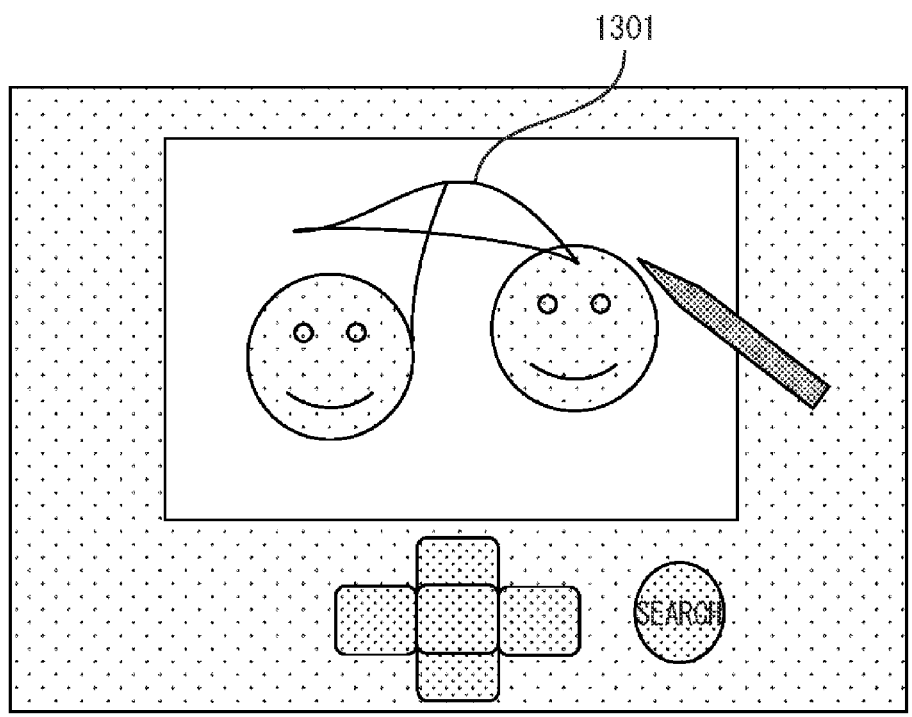
FIG. 16 illustrates an example of the touch panel of the photo printer when the handwriting is input thereon.

FIG. 15 is a flowchart illustrating an example of the processing performed by the photo printer. FIG. 16 illustrates an example of the touch panel of the photo printer when the handwriting is input thereon by a user.

Steps S1201, S1202, S1203, and S1204 in FIG. 15 are similar to steps S501, S502, S503, and S504 in FIG. 5. In step S1204, when it is detected that the search button 104 is pressed (YES in step S1204), the handwriting input unit 201 of the photo printer 101 inputs the information about the handwriting stroke (handwriting stroke information).

The photo printer 101 searches an icon based on the handwriting stroke information. In order to search the icon, in step S1205, the face recognition unit 1102 of the photo printer 101 recognizes the face in the displayed photo to determine the number of the faces and the position of each face with respect to the handwriting stroke 1301.

In FIG. 16, the face recognition unit 1102 recognizes as follows.

Number of faces=2

Position of face with respect to handwriting stroke=Under
The prior art can be applied to the recognition processing by the face recognition unit 1102.

In step S1206, the matching level evaluation unit 1103 evaluates the matching level between each icon, which is stored in the icon database, and the icon, which is searched by the user. The matching level evaluation unit 1103 calculates the matching level between the handwriting stroke information input by the user and the handwriting stroke information 1401 given to each icon.

The matching level evaluation unit 1103 further calculates the matching level between the information about the number of the faces output by the face recognition unit 1102 and information 1402 given to each icon about the number of the faces, which is likely to be used in the photo, and furthermore the matching level between the information about the position of the face output by the face recognition unit 1102 and the information 1403 given to each icon about the position of the face, which is likely to be used.

The matching level evaluation unit 1103 evaluates the final matching level (total matching level) by calculating both the matching levels of the number of and the position of the faces. FIG. 17 illustrates the matching levels of four icons 1, 2, 3, and 4 illustrated in FIG. 14.

The matching level evaluation unit 1103 sets the matching level of the number of the faces to "0.2", when the information 1402 given to each icon about the number of the faces, which is likely to be used in the photo, is "uncertain". Further, when the information 1402 about the number of the faces has no description, the matching level evaluation unit 1103 sets the matching level of the number of the faces to "0.0".

The matching level evaluation unit 1103 calculates the matching level of the number of the faces as follows. The number of the faces output by the face recognition unit 1102 is defined as "X" when a value of the information 1402 of the number of the faces is defined as "Y".

Matching level of number of faces=1−|X−Y|/(X+Y)
(| |=absolute value)

On the other hand, the matching level evaluation unit 1103 sets the matching level of the position of the face to "1.0" when "above", "under", "right", and "left" have the same value, and to "0.0" when they do not have the same value.

Since the icons 2 and 4 have handwriting stroke shapes each similar to that of the input handwriting stroke, the matching levels of the icons 2 and 4 have the large values. Further, since the icon 2 has the shape of the handwriting stroke information more similar to that of the input handwriting stroke than the icon 4, the icon 2 has the larger value than icon 4.

Figure 18:
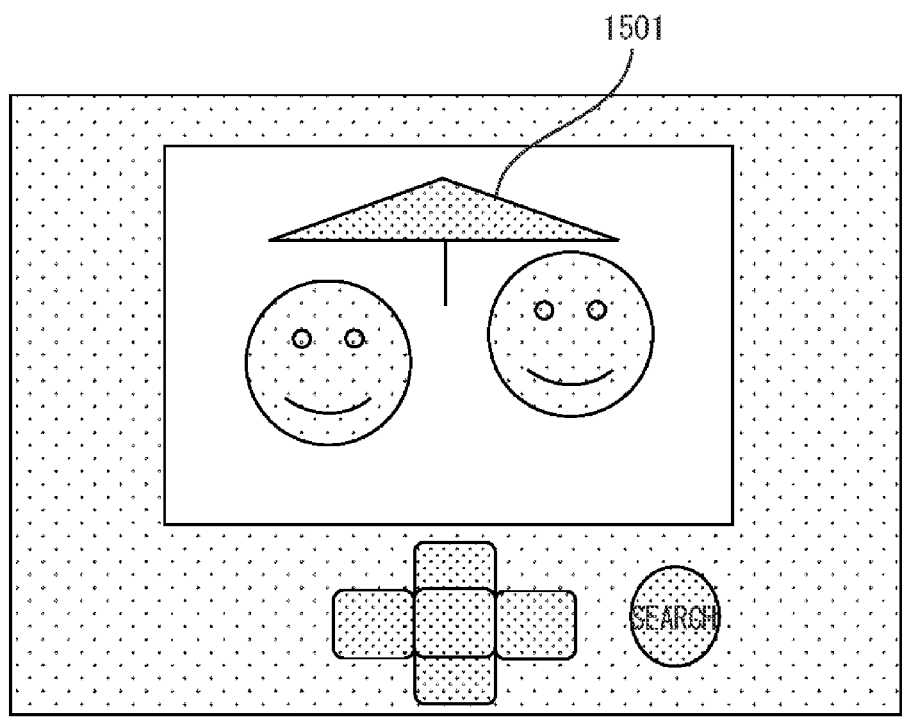
FIG. 18 illustrates an example of the touch panel of the photo printer when the searched icon is displayed thereon.

On the other hand, regarding the number of the faces and the closeness of the positions of the faces, the icon 4 has the higher matching levels and thus has the larger value. As described above, the icon 4 has the highest matching level, and the search unit 1105 outputs the icon 4 as the search result. In step S1207, the display unit 1106 displays the icon 4 in place of the handwriting stroke on the touch panel as the icon 1501 illustrated in FIG. 18.

If the photo printer 101 had performed the search by using only the matching level of the handwriting stroke information, the "beach parasol" of the icon 2 should have been obtained as the search result. However, the information about the number of the faces in the photo on which the icon is to be added, and about the position of the face, is added to evaluate the matching level so that the "umbrella for couple", which is more suitable for a condition of the "two faces under the icon" can be obtained as the search result, but not the "beach parasol". As described above, the present exemplary embodiment can enhance the search accuracy and enables the user to efficiently work on editing for adding the icon on the photo.

The first exemplary embodiment uses the attribute information about the photo shooting date and time and the attribute information about "the period when the icon is likely to be used". The second exemplary embodiment uses the attribute information about the photo shooting location and the attribute information about "the place where the icon is likely to be used".

As described above, any exemplary embodiment uses a piece of attribute information. However, a plurality of attribute information groups may be used. For example, both attribute information of the photo shooting date and time and the photo shooting location, and both of the "period when the icon is likely to be used" and the "place where the icon is likely to be used" may be simultaneously used to calculate the matching level.

The first, second, and third exemplary embodiments use the matching level of the handwriting stroke and the matching level of the attribute of the photo to calculate a simple sum as the final matching level. However, a method for calculating the matching level is not limited to the exemplary embodiments described above.

Further, a method for acquiring a product or a weighted average in addition to a simple total value may be used. Any method may be used, which acquires the larger value of the final matching level when the matching level of the handwriting stroke becomes higher or the matching level of the attribute becomes higher.

Other methods can be used to acquire the matching level of the number of the faces and the matching level of the position of the face in the third exemplary embodiment. The method may calculate the matching level of the number of the faces to acquire the larger value when the matching level between the number of the faces output by the face recognition unit 1102 and the value of the information 1402 about the number of the faces become higher. Further, the matching level of the position of the face may be acquired by calculating numeral values using coordinate values not limiting the position of the face to the "above", "under", "right", and "left".

The first, second, and third exemplary embodiments describe the photo as an example of the editing target data, however any digital data, which can be displayed on the touch panel, may be used.

In the first exemplary embodiment, any digital data may be used, which includes the editing target data having the date as the metadata. In the second exemplary embodiment, any digital data may be used, which includes the editing target data having the location information as the metadata. In the third exemplary embodiment, any digital data may be used, which includes the editing target data as the image data.

The first, second, and third exemplary embodiments describe that the icon having the highest matching level is displayed on the touch panel as the search result. However, top "N" candidates in matching level maybe acquired to propose the candidates to the user, and the icon selected by the user from among the candidates may be displayed.

In the first, second, third exemplary embodiments, the photo printer is used as the example, however, any other digital device may be used.

In the first, second, third exemplary embodiments, the pen is used to perform the input to the touch panel. However, another method may be used, such as, input with a finger. Further, the exemplary embodiments are not limited to use of the touch panel, and a mouse may be used to input the track of the handwriting.

The above-described exemplary embodiments may be applied to a system including a plurality of devices (for example, a host computer, an interface device, a reader, and a printer), or a stand-alone device (for example, a copy machine, a printer, and a facsimile apparatus).

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

Further, by executing a program code read out by the system or the CPU of the apparatus, an operating system (OS), which runs in the system or in the apparatus, executes a part or all of actual processing based on a direction by a program code. The present invention further includes such a case described above in which the function of the exemplary embodiments can be realized by the processing.

When the program code readout from the storage medium is written into a function extension card inserted into the system or the apparatus or a memory included in a connected function extension unit, the CPU included in the function extension card or the function extension unit executes a part or all of the actual processing based on the direction by the program code. The present invention further includes such a case described above in which the function of the exemplary embodiments can be realized by the processing.

When the above-described embodiments are applied to the storage medium, the storage medium (computer readable storage medium) stores the program code corresponding to the flowchart described above.

Each of the above-described exemplary embodiments can enhance the search accuracy and decrease the work load for adding the additional data including a work for searching the additional data, when the additional data to be added to the editing target data is searched using the handwriting input.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-312627 filed Dec. 8, 2008, which is hereby incorporated by reference herein in its entirety.

What is claimed is:

1. An information processing apparatus comprising:
a display control unit configured to display on a display a photo having attribute information about conditions when the photo is shot;
an input unit configured to input a handwriting stroke on the photo displayed on the display;
an acquisition unit configured to acquire the attribute information;
a search unit configured to search additional image data to be added to the photo based on a shape of the handwriting stroke and the attribute information; and
wherein the display control unit is further configured to replace the handwriting stroke input on the photo displayed on the display with the additional image data searched for by the search unit, and
the search unit calculates a matching level between the input handwriting stroke and a pattern previously associated with the additional image data to be added to the photo, and a matching level between the attribute information of the photo and attribute information of the additional image data, and searches the additional image data by using the matching levels.

2. The information processing apparatus according to claim 1,
wherein the acquisition unit recognizes a face included in the photo, extracts a number of recognized faces and acquire a position of each of the recognized face as the attribute information about the conditions when the photo is shot.

3. An information processing method performed by an information processing apparatus, comprising:
displaying on a display a photo having attribute information about conditions when the photo is shot;
inputting a handwriting stroke on the photo displayed on the display;
acquiring the attribute information about the conditions when the photo is shot;
searching additional image data to be added to the photo based on a shape of the handwriting stroke and the attribute information;
replacing the handwriting stroke input on the photo displayed on the display with the searched additional image data; and
calculating a matching level between the input handwriting stroke and a pattern previously associated with the additional image data to be added to the photo, and a matching level between the attribute information of the photo and attribute information of the additional image data, and searching the additional image data by using the matching levels.

4. A non-transitory computer readable storage medium storing a computer-executable program that causes a computer to execute an information processing method, the method comprising:
displaying a photo having attribute information about conditions when the photo is shot on a display;
inputting a handwriting stroke on the photo displayed on the display;
acquiring the attribute information about conditions when the photo is shot;

searching additional image data to be added to the photo based on a shape of the handwriting stroke;

replacing the handwriting stroke with the searched additional image data; and calculating a matching level between the input handwriting stroke and a pattern previously associated with the additional image data to be added to the photo, and a matching level between the attribute information of the photo and attribute information of the additional image data, and searching the additional image data by using the matching levels.

5. An information processing apparatus comprising:

a display control unit configured to display a photo having attribute information about conditions when the photo is shot on a display;

an input unit configured to input a handwriting stroke on the photo displayed on a display;

an acquisition unit configured to acquire first attribute information of the photo displayed on the display;

a storage unit configured to store a plurality of additional image data which can be added to the photo, each of the additional image data corresponding to each of a plurality of handwriting strokes which can be input by the input unit, wherein the storage unit stores each of the additional image data in association with second attribute information;

a determination unit configured to determine at least one of the additional image data to be added to the photo displayed on the display based on a relationship between the first attribute information and the second attribute information; and wherein the display control unit is further configured to replace the handwriting stroke input on the photo displayed on the display with the additional image data determined by the determination unit.

6. The information processing apparatus according to claim 5, wherein the acquisition unit acquires, as the first attribute information, shooting date and time information of the photo displayed on the display;

the storage unit stores each of the plurality of additional image data in association with period information as the second attribute information;

wherein the determination unit determines the at least one additional image data to be added to the photo based on a relationship between the shooting date and time information and the period information.

7. The information processing according to claim 5, wherein:

the acquisition unit acquires, as the first attribute information, information about a shooting location of the photo displayed on the display;

the storage unit stores each of the plurality of additional data in association with the information of a location where the image data is likely to be used as the second attribute information; and wherein the determination unit determines the at least one of the additional image data to be added to the photo, based on a relationship between the information about the shooting location given to the photo as the first attribute information acquired by the acquisition unit and the information of the location where the image data is likely to be used stored as the second attribute information in the storage unit in association with the handwriting stroke input on the photo by the input unit.

8. The information processing apparatus according to claim 7, wherein the photo includes image data, and further comprising a recognition unit configured to recognize at least one face included in the image data, wherein the acquisition unit extracts and acquires a number and a position of the at least one face recognized by the recognition unit as the attribute information.

9. The information apparatus according to claim 5, further comprising an identifying unit configured to identify the handwriting stroke input on the photo by the input unit, from among the plurality of handwriting strokes which can be input by the input unit each of which corresponds to each of the plurality of additional image data stored in the storage unit, wherein the determination unit determines the at least one additional image data to be added to the photo, based on a relationship between the first attribute information acquired by the acquisition unit and the second attribute information associated with additional image data corresponding to the handwriting stroke identified by the identification unit.

10. A non-transitory computer readable storage medium storing a computer-executable program that causes a computer to execute an information processing method, the method comprising:

displaying a photo having attribute information about conditions when the photo is shot on a display;

inputting a handwriting stroke to the photo displayed on the display;

acquiring first attribute information of the photo;

storing, in a storage unit, a plurality of additional image data which can be added to the photo, each of the plurality of additional image data corresponding to each of a plurality of handwriting strokes which can be input, wherein the storage unit stores each of the plurality of additional image data in association with second attribute information;

determining at least one of the additional image data to be added to the photo based on a relationship between the acquired first attribute information and the second attribute information; and replacing the handwriting stroke input on the photo displayed on the display with the determined additional image data which is determined.

11. The information processing apparatus according to claim 1, wherein the display control unit is configured to cause the display to display a photo to be printed.

12. The information processing apparatus according to claim 1, wherein the attribute information about conditions when the photo is shot includes at least one of shooting date and time information, information about a shooting location, or a number of faces included in the photo.

13. The information processing apparatus according to claim 5, wherein the display control unit is configured to cause the display to display a photo to be printed.

* * * * *